US012604275B2

(12) United States Patent
Ling et al.

(10) Patent No.: US 12,604,275 B2
(45) Date of Patent: Apr. 14, 2026

(54) METHOD AND APPARATUS FOR PUSCH TRANSMISSION WITH REPETITIONS

(71) Applicant: Lenovo (Beijing) Limited, Beijing (CN)

(72) Inventors: Wei Ling, Beijing (CN); Chenxi Zhu, Beijing (CN); Bingchao Liu, Beijing (CN); Yi Zhang, Beijing (CN); Lingling Xiao, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 342 days.

(21) Appl. No.: 18/552,994

(22) PCT Filed: Apr. 1, 2021

(86) PCT No.: PCT/CN2021/084910
§ 371 (c)(1),
(2) Date: Sep. 28, 2023

(87) PCT Pub. No.: WO2022/205302
PCT Pub. Date: Oct. 6, 2022

(65) Prior Publication Data
US 2024/0187995 A1      Jun. 6, 2024

(51) Int. Cl.
*H04W 52/10*      (2009.01)
*H04W 52/14*      (2009.01)
*H04W 72/232*    (2023.01)

(52) U.S. Cl.
CPC ......... *H04W 52/10* (2013.01); *H04W 52/146* (2013.01); *H04W 72/232* (2023.01)

(58) Field of Classification Search
CPC ... H04W 52/10; H04W 52/14; H04W 52/146; H04W 72/232
See application file for complete search history.

(56) References Cited

U.S. PATENT DOCUMENTS 11,523,349 B1 *  12/2022  Huang .................. H04W 52/58
11,671,925 B2 *  6/2023  Chen ................. H04W 72/1268
                                                        370/328

(Continued)

FOREIGN PATENT DOCUMENTS

| CN | 110049539 A | 7/2019 |
|---|---|---|
| CN | 111083773 A | 4/2020 |
| CN | 111602361 A | 8/2020 |

OTHER PUBLICATIONS

PCT/CN2021/084910 , "International Preliminary Report on Patentability", PCT Application No. PCT/CN2021/084910, Oct. 12, 2023, 5 pages.

(Continued)

*Primary Examiner* — Hai V Nguyen
(74) *Attorney, Agent, or Firm* — FIG. 1 Patents

(57) ABSTRACT

Embodiments of the present application are related to a method and apparatus for PUSCH transmission with repetitions. An exemplary method includes: receiving DCI scheduling a plurality of repetitions of a PUSCH transmission, wherein there is at least one open-loop power control parameter set indication in the DCI; receiving configuration information associated with the PUSCH transmission, indicating: a first and a second SRS resource sets, a mapping pattern, and at least one list of P0-PUSCH-Set, wherein a first part of the plurality of repetitions is associated with the first SRS resource set and a second part of the plurality of repetitions is associated with the second SRS resource set according to the mapping pattern: and transmitting the first part and second part of the plurality of repetitions according to a first P0 value and a second P0 value respectively determined based on the received DCI and configuration information.

20 Claims, 7 Drawing Sheets

(56)     References Cited

U.S. PATENT DOCUMENTS

| | | | | |
|---|---|---|---|---|
| 11,750,328 | B2 * | 9/2023 | Cirik | H04W 72/232 |
| | | | | 370/329 |
| 11,864,124 | B2 * | 1/2024 | Huang | H04W 52/146 |
| 2021/0050971 | A1 | 2/2021 | Manolakos | |
| 2022/0210748 | A1 * | 6/2022 | Huang | H04W 52/242 |
| 2022/0217653 | A1 * | 7/2022 | Kung | H04W 52/367 |
| 2022/0225247 | A1 * | 7/2022 | Huang | H04W 52/34 |
| 2022/0369243 | A1 * | 11/2022 | Chen | H04W 52/245 |
| 2022/0394624 | A1 * | 12/2022 | Huang | H04W 52/58 |
| 2023/0053727 | A1 * | 2/2023 | Huang | H04W 72/23 |
| 2023/0179333 | A1 * | 6/2023 | Cirik | H04W 72/232 |
| 2023/0269057 | A1 * | 8/2023 | Sengupta | H04L 5/0092 |
| | | | | 370/329 |
| 2024/0015753 | A1 * | 1/2024 | Matsumura | H04L 5/0053 |
| 2024/0172317 | A1 * | 5/2024 | Cirik | H04B 7/0456 |
| 2024/0178965 | A1 * | 5/2024 | Gao | H04L 5/0091 |
| 2024/0214943 | A1 * | 6/2024 | Rudolf | H04W 72/232 |
| 2024/0251403 | A1 * | 7/2024 | Chen | H04W 72/0473 |
| 2024/0298271 | A1 * | 9/2024 | Gao | H04L 5/0048 |
| 2024/0314704 | A1 * | 9/2024 | Li | H04W 52/146 |
| 2024/0333460 | A1 * | 10/2024 | Xiao | H04L 5/0094 |
| 2024/0340866 | A1 * | 10/2024 | MolavianJazi | H04L 5/0035 |
| 2024/0406889 | A1 * | 12/2024 | Yuan | H04W 52/48 |
| 2024/0422690 | A1 * | 12/2024 | Guo | H04W 52/146 |
| 2025/0150987 | A1 * | 5/2025 | Muruganathan | H04W 52/367 |

OTHER PUBLICATIONS

PCT/CN2021/084910 , "International Search Report and Written Opinion", PCT Application No. PCT/CN2021/084910, Jan. 4, 2022, 6 pages.

Qualcomm Incorporated , "Enhancements on Multi-TRP for PDCCH, PUCCH and PUSCH", 3GPP TSG-RAN WG1 Meeting #104-e, R1-2101447, e-Meeting [retrieved Dec. 1, 2023]. Retrieved from the Internet <https://www.3gpp.org/ftp/tsg_ran/WG1_RL1/TSGR1_104-e/Docs>, Jan. 2021, 28 pages.

"Extended European Search Report", EP Application No. 21933961.1, Nov. 20, 2024, 10 pages.

"3rd Generation Partnership Project; Technical Specification Group Radio Access", 3GPP TS 38.213 V16.5.0; NR; Physical Layer Procedures for Control (Release 16), Mar. 2021, 184 pages.

Vivo, "Enhancements on Multi-TRP for PDCCH, PUCCH and PUSCH", 3GPP TSG RAN WG1 #104-e, R1-2100422, e-Meeting [retrieved Nov. 28, 2023]. Retrieved from the Internet <https://www.3gpp.org/ftp/tsg_ran/WG1_RL1/TSGR1_104-e/Docs>, Jan. 2021, 28 pages.

* cited by examiner

100

101

102

UE                                                    BS

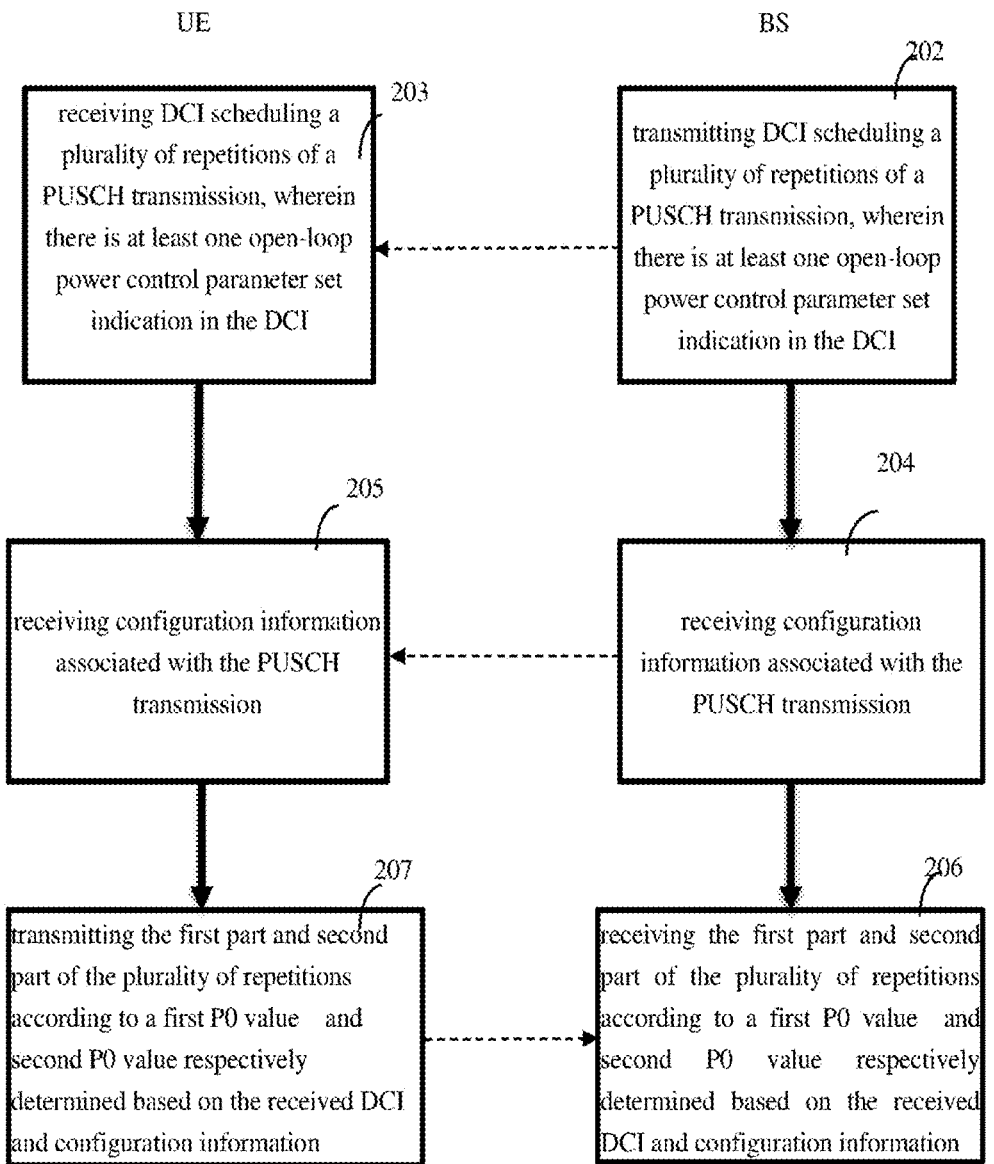

receiving DCI scheduling a
plurality of repetitions of a
PUSCH transmission, wherein
there is at least one open-loop
power control parameter set
indication in the DCI
203 transmitting DCI scheduling a
plurality of repetitions of a
PUSCH transmission, wherein
there is at least one open-loop
power control parameter set
indication in the DCI
202 receiving configuration information
associated with the PUSCH
transmission
205 receiving configuration
information associated with the
PUSCH transmission
204 transmitting the first part and second
part of the plurality of repetitions
according to a first P0 value   and
second P0 value respectively
determined based on the received DCI
and configuration information
207 receiving the first part and second
part of the plurality of repetitions
according to a first P0 value   and
second   P0   value   respectively
determined based on the received
DCI and configuration information
206

FIG. 2

METHOD AND APPARATUS FOR PUSCH TRANSMISSION WITH REPETITIONS

TECHNICAL FIELD

Embodiments of the present application relate to wireless communication technology, especially to a method and an apparatus for physical uplink shared channel (PUSCH) transmission with repetitions.

BACKGROUND OF THE INVENTION

In new radio (NR) R17, it is proposed to identify and specify features to improve reliability and robustness for channels other than physical downlink shared channel (PDSCH) using multiple transmission reception points (TRP) and/or multi-panel, with R16 reliability features. The concerned channels other than PDSCH are: physical downlink control channel (PDCCH), PUSCH, and physical uplink control channel (PUCCH). Specifically, regarding PUSCH, PUSCH repetitions with multiple beams or multiple TRPs can utilize the spatial diversity of multiple beams (a beam may be represented by spatial relation information) or TRPs of PUSCH transmission to increase the reliability and robustness.

In addition, according to R16 ultra reliable low latency communication (URLLC), open-loop power control for PUSCH transmission is enhanced. Specifically, P0-PUSCH-Set-r16 is configured for a user equipment (UE), and one open-loop power control parameter set indication field is used to switch between a P0 value from the P0-PUSCH-AlphaSet indicated by sounding reference signal (SRS) resource indicator (SRI) and another P0 value from the configured P0-PUSCH-Set-r16 indicated by SRI. However, as agreed in RAN1 #104e, there will be two SRI fields in downlink control information (DCI) scheduling a PUSCH transmission with repetitions in R17, that is, there will be two SRIs. Accordingly, there will be two P0 values to be determined from the P0-PUSCH-AlphaSet indicated by the two SRIs.

Therefore, how to improve the open-loop power control for PUSCH transmission with repetitions should be further studied.

SUMMARY

One objective of the embodiments of the present application is to provide a technical solution for PUSCH transmission with repetitions, especially for PUSCH transmission with repetitions using different SRS source sets.

Some embodiments of the present application provide a method, which includes: receiving DCI scheduling a plurality of repetitions of a PUSCH transmission, wherein there is at least one open-loop power control parameter set indication in the DCI; receiving configuration information associated with the PUSCH transmission, indicating: a first SRS resource set and a second SRS resource set, a mapping pattern, and at least one list of P0-PUSCH-Set, wherein a first part of the plurality of repetitions is associated with the first SRS resource set and a second part of the plurality of repetitions is associated with the second SRS resource set according to the mapping pattern; transmitting the first part of the plurality of repetitions according to a first P0 value determined based on the received DCI and configuration information; and transmitting the second part of the plurality of repetitions according to a second P0 value determined based on the received DCI and configuration information.

Some other embodiments of the present application provide another method, which includes: transmitting DCI scheduling a plurality of repetitions of a PUSCH transmission, wherein there is at least one open-loop power control parameter set indication in the DCI; transmitting configuration information associated with the PUSCH transmission, indicating: a first SRS resource set and a second SRS resource set, a mapping pattern, and at least one list of P0-PUSCH-Set, wherein a first part of the plurality of repetitions is associated with the first SRS resource set and a second part of the plurality of repetitions is associated with the second SRS resource set according to the mapping pattern; receiving the first part of the plurality of repetitions according to a first P0 value determined based on the received DCI and configuration information; and receiving the second part of the plurality of repetitions according to a second P0 value determined based on the received DCI and configuration information.

According to some embodiments of the present application, there is one open-loop power control parameter set indication in the DCI and one list of P0-PUSCH-Set indicated by the configuration information, and the method includes: in the case that there are two SRI fields in the DCI and a value of the one open-loop power control parameter set indication is '1', determining the first P0 value from a first value in the one list of P0-PUSCH-Set with a first P0-PUSCH-Set-ID value mapped to a first SRI field value, and determining the second P0 value from a first value in the one list of P0-PUSCH-Set with a second P0-PUSCH-Set-ID value mapped to a second SRI field value; or in the case that there is no SRI field in the DCI and the value of the one open-loop power control parameter set indication is '1' or '01', determining the first P0 value and the second P0 value from a first value in the one list of P0-PUSCH-Set with a lowest P0-PUSCH-Set-ID value; or in the case that there is no SRI field in the DCI and the value of the one open-loop power control parameter set indication is '10', determining the first P0 value and the second P0 value from a second value in the one list of P0-PUSCH-Set with the lowest P0-PUSCH-Set-ID value.

According to some other embodiments of the present application, there are two open-loop power control parameter set indications in the DCI and one list of P0-PUSCH-Set indicated by the configuration information, wherein a first open-loop power control parameter set indication is associated with the first SRS resource set and a second open-loop power control parameter set indication is associated with the second SRS resource set, and the method includes: in the case that there is a first SRI field associated with the first SRS resource set in the DCI and a value of the first open-loop power control parameter set indication is '1', determining the first P0 value from a first value in the one list of P0-PUSCH-Set with a P0-PUSCH-Set-ID value mapped to a value of the first SRI field; or in the case that there is no SRI field associated with the first SRS resource set in the DCI and the value of the first open-loop power control parameter set indication is '1' or '01', determining the first P0 value from a first value in the one list of P0-PUSCH-Set with a lowest P0-PUSCH-Set-ID value; or in the case that there is no SRI field associated with the first SRS resource set in the DCI and the value of the first open-loop power control parameter set indication is '10', determining the first P0 value from a second value in the one list of P0-PUSCH-Set with the lowest P0-PUSCH-Set-ID value.

According to some other embodiments of the present application, there are two open-loop power control parameter set indications in the DCI and one list of P0-PUSCH-Set indicated by the configuration information, wherein a first open-loop power control parameter set indication is associated with the first SRS resource set and a second open-loop power control parameter set indication is associated with the second SRS resource set, and the method includes: in the case that there is a second SRI field associated with the second SRS resource set in the DCI and a value of the second open-loop power control parameter set indication is '1', determining the second P0 value from a first value in the one list of P0-PUSCH-Set with a P0-PUSCH-Set-ID value mapped to a value of the second SRI field; or in the case that there is no SRI field associated with the second SRS resource set in the DCI and the value of the second open-loop power control parameter set indication is '1' or '01', determining the second P0 value from a first value in the one list of P0-PUSCH-Set with a lowest P0-PUSCH-Set-ID value; or in the case that there is no SRI field associated with the second SRS resource set in the DCI and the value of the second open-loop power control parameter set indication is '10', determining the second P0 value from a second value in the one list of P0-PUSCH-Set with the lowest P0-PUSCH-Set-ID value.

According to some yet other embodiments of the present application, there is one open-loop power control parameter set indication in the DCI and two lists of P0-PUSCH-Set indicated by the configuration information, wherein a first P0-PUSCH-Set list is associated with the first SRS resource set and a second P0-PUSCH-Set list is associated with the second SRS resource set, and the method includes: in the case that there are two SRI fields in the DCI and a value of the one open-loop power control parameter set indication is '1', determining the first P0 value from a first value in the first P0-PUSCH-Set list with a first P0-PUSCH-Set-ID value mapped to a first SRI field value, and determining the second P0 value from a first value in the second P0-PUSCH-Set list with a second P0-PUSCH-Set-ID value mapped to a second SRI field value; or in the case that there is no SRI field in the DCI and the value of the one open-loop power control parameter set indication is '1' or '01', determining the first P0 value from a first value in the first P0-PUSCH-Set list with a first lowest P0-PUSCH-Set-ID value and determining the second P0 value from a first value in the second P0-PUSCH-Set list with a second lowest P0-PUSCH-Set-ID value; or in the case that there is no SRI field in the DCI and the value of the one open-loop power control parameter set indication is '10,' determining the first P0 value from a second value in the first P0-PUSCH-Set list with the first lowest P0-PUSCH-Set-ID value and determining the second P0 value from a second value in the second P0-PUSCH-Set list with the second lowest P0-PUSCH-Set-ID value.

According to some yet other embodiments of the present application, there are two open-loop power control parameter set indications in the DCI and two lists of P0-PUSCH-Set lists indicated by the configuration information, wherein a first open-loop power control parameter set indication and a first P0-PUSCH-Set list are associated with the first SRS resource set, and a second open-loop power control parameter set indication and a second P0-PUSCH-Set list are associated with the second SRS resource set, and the method includes: in the case that there is a first SRS resource indicator (SRI) field associated with the first SRS resource set in the DCI and a value of the first open-loop power control parameter set indication is '1', determining the first P0 value from a first value in the first P0-PUSCH-Set list with a P0-PUSCH-Set-ID value mapped to a value of the first SRI field; or in the case that there is no SRI field associated with the first SRS resource set in the DCI and the value of the first open-loop power control parameter set indication is '1' or '01', determining the first P0 value from a first value in the first P0-PUSCH-Set list with a lowest P0-PUSCH-Set-ID value; or in the case that there is no SRI field associated with the first SRS resource set in the DCI and the value of the first open-loop power control parameter set indication is '10', determining the first P0 value from a second value in the first P0-PUSCH-Set list with the lowest P0-PUSCH-Set-ID value.

According to some yet other embodiments of the present application, there are two open-loop power control parameter set indications in the DCI and two lists of P0-PUSCH-Set lists indicated by the configuration information, wherein a first open-loop power control parameter set indication and a first P0-PUSCH-Set list are associated with the first SRS resource set, and a second open-loop power control parameter set indication and a second P0-PUSCH-Set list are associated with the second SRS resource set, and the method includes: in the case that there is a second SRS resource indicator (SRI) field associated with the second SRS resource set in the DCI and a value of the second open-loop power control parameter set indication is '1', determining the second P0 value from a first value in the second P0-PUSCH-Set list with a P0-PUSCH-Set-ID value mapped to a value of the second SRI field; or in the case that there is no SRI field associated with the second SRS resource set in the DCI and the value of the second open-loop power control parameter set indication is '1' or '01', determining the second P0 value from a first value in the second P0-PUSCH-Set list with a lowest P0-PUSCH-Set-ID value; or in the case that there is no SRI field associated with the second SRS resource set in the DCI and the value of the second open-loop power control parameter set indication is '10', determining the second P0 value from a second value in the second P0-PUSCH-Set list with the lowest P0-PUSCH-Set-ID value.

Yet another embodiment of the present application provides an apparatus, including: at least one non-transitory computer-readable medium having stored thereon computer-executable instructions; at least one receiving circuitry; at least one transmitting circuitry; and at least one processor coupled to the at least one non-transitory computer-readable medium, the at least one receiving circuitry and the at least one transmitting circuitry. The computer-executable instructions cause the at least one processor to implement any method according to an embodiment of the present application with the at least one receiving circuitry and the at least one transmitting circuitry.

Embodiments of the present application can improve reliability and robustness for uplink transmissions, especially for PUSCH with repetitions using different beams, and will facilitate the deployment and implementation of the NR.

BRIEF DESCRIPTION OF THE DRAWINGS

In order to describe the manner in which advantages and features of the present disclosure can be obtained, a description of the present disclosure is rendered by reference to specific embodiments thereof which are illustrated in the appended drawings. These drawings depict only exemplary embodiments of the present disclosure and are not therefore intended to limit the scope of the present disclosure.

FIG. 2 illustrates a flow chart of a method for PUSCH transmission with repetitions according to some embodiments of the present application;

DETAILED DESCRIPTION

The detailed description of the appended drawings is intended as a description of the currently preferred embodiments of the present disclosure and is not intended to represent the only form in which the present disclosure may be practiced. It is to be understood that the same or equivalent functions may be accomplished by different embodiments that are intended to be encompassed within the spirit and scope of the present disclosure.

Reference will now be made in detail to some embodiments of the present disclosure, examples of which are illustrated in the accompanying drawings. To facilitate understanding, embodiments are provided under specific network architecture and new service scenarios, such as 3rd generation partnership project (3GPP) 5G, 3GPP long term evolution (LTE) Release 8 and so on. Persons skilled in the art know very well that, with the development of network architecture and new service scenarios, the embodiments in the present disclosure are also applicable to similar technical problems.

Figure 1:
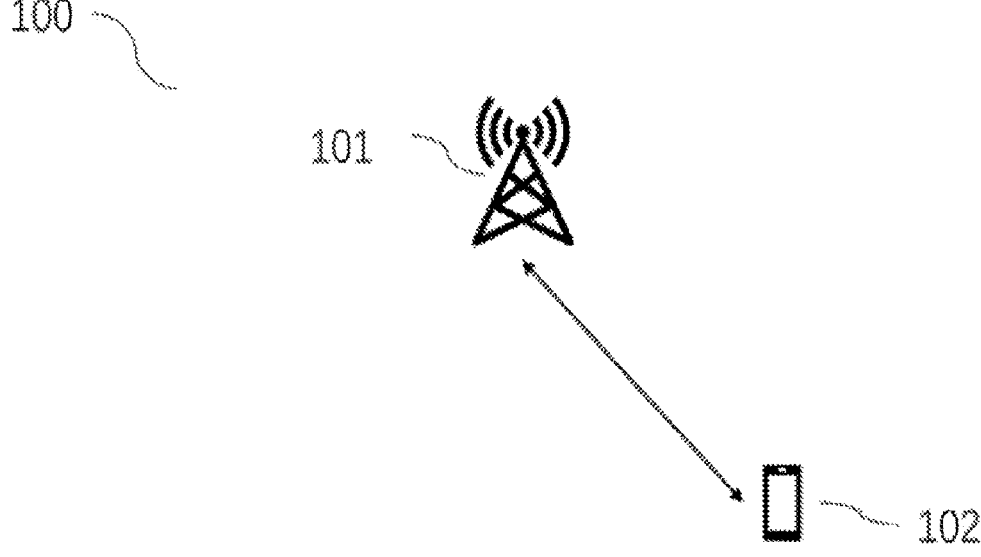
FIG. 1 is a schematic diagram illustrating an exemplary wireless communication system according to some embodiments of the present application.

FIG. 1 illustrates a schematic diagram of an exemplary wireless communication system 100 according to some embodiments of the present application.

As shown in FIG. 1, the wireless communication system 100 includes a UE 102 and a BS 101. Although merely one BS is illustrated in FIG. 1 for simplicity, it is contemplated that the wireless communication system 100 may include more BSs in some other embodiments of the present application. Similarly, although merely one UE is illustrated in FIG. 1 for simplicity, it is contemplated that the wireless communication system 100 may include more UEs in some other embodiments of the present application.

The BS 101 may also be referred to as an access point, an access terminal, a base, a macro cell, a node-B, an enhanced node B (eNB), a gNB, a home node-B, a relay node, or a device, or described using other terminology used in the art. The BS 101 is generally part of a radio access network that may include a controller communicably coupled to the BS 101.

The UE 102 may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, and modems), or the like. According to an embodiment of the present application, the UE 102 may include a portable wireless communication device, a smart phone, a cellular telephone, a flip phone, a device having a subscriber identity module, a personal computer, a selective call receiver, or any other device that is capable of sending and receiving communication signals on a wireless network. In some embodiments, the UE 102 may include wearable devices, such as smart watches, fitness bands, optical head-mounted displays, or the like. Moreover, the UE 102 may be referred to as a subscriber unit, a mobile, a mobile station, a user, a terminal, a mobile terminal, a wireless terminal, a fixed terminal, a subscriber station, a user terminal, or a device, or described using other terminology used in the art.

The wireless communication system 100 is compatible with any type of network that is capable of sending and receiving wireless communication signals. For example, the wireless communication system 100 is compatible with a wireless communication network, a cellular telephone network, a time division multiple access (TDMA)-based network, a code division multiple access (CDMA)-based network, an orthogonal frequency division multiple access (OFDMA)-based network, an LTE network, a 3GPP-based network, a 3GPP 5G network, a satellite communications network, a high altitude platform network, and/or other communications networks.

For PUSCH (or PUSCH transmission), there are two transmission schemes are supported according to TS 38.214 in R15/R16, i.e., codebook based transmission and non-codebook based transmission. Some related contents are as following:

"A UE is configured with codebook based transmission when the higher layer parameter txConfig in pusch-Config is set to "codebook," and the UE is configured non-codebook based transmission when the higher layer parameter txConfig is set to "nonCodebook." If the higher layer parameter txConfig is not configured, the UE is not expected to be scheduled by DCI format 0_1 or 0_2. If PUSCH is scheduled by DCI format 0_0, the PUSCH transmission is based on a single antenna port. Except if the higher layer parameter enable DefaultBeamPL-ForPUSCH0-r16 is set "enabled," the UE shall not expect PUSCH scheduled by DCI format 0_0 in a bandwidth part (BWP) without configured physical uplink control channel (PUCCH) resource with PUCCH-SpatialRelationInfo in FR 2 in RRC connected mode. In both the two transmission schemes, the indicated SRI in slot n is associated with the most recent transmission of SRS resource identified by the SRI, where the SRS resource is prior to the physical downlink control channel (PDCCH) carrying the SRI. In codebook based transmission scheme, the UE shall transmit PUSCH using the same antenna port(s) as the SRS port(s) in the SRS resource indicated by the DCI format 0_1 or 0_2 or by configuredGrantConfig according to clause 6.1.2.3. In non-codebook based transmission, the UE shall transmit PUSCH using the same antenna ports as the SRS port(s) in the SRS resource(s) indicated by SRI(s) given by DCI format 0_1 or by configuredGrantConfig according to clause 6.1.2.3, where the SRS port in (i+1)-th SRS resource in the SRS resource set is indexed as $p_i=1000+i$."

Although the above descriptions on PUSCH transmission schemes are provided according to TS 38.214, they may be changed or updated as the evolution of 3GPP specifications or other related specifications/protocols, and thus should not be limited to the above.

In addition, PUSCH repetitions with multiple beams or TRPs can utilize the spatial diversity of multiple beams or TRPs of PUSCH transmission, and thus can greatly increase the reliability and robustness of uplink data transmissions. According to the agreements in RAN1 #104e, there will be two SRS resource sets associated with a PUSCH transmission with repetitions in R17, and if there is SRI field(s) present in DCI scheduling a PUSCH with repetition, there will be two SRI fields in the DCI. The value of each SRI field (also referred to as "SRI field value", or "SRI value") will indicate a P0 value by mapping the SRI field value to a SRI-PUSCH-PowerControl list, wherein "P0 value" is provided in 3GPP specifications for defining the target power of a PUSCH transmission without repetition or one PUSCH repetition. Accordingly, two P0 values need to be respectively determined for the repetitions of a PUSCH transmission. To support these agreements, several technical problems should be further studied and solved. For example, how to enhance the open-loop power control parameter set indication (e.g., OL-PC PSI field) in the DCI scheduling a PUSCH with repetitions if it is required, and whether to indicate two P0 values by mapping SRI field value(s) to P0-PUSCH-Set-r16 or the like etc.

At least to deal with the above technical problem, embodiments of the present application propose an improved technical solution for PUSCH transmission with repetitions.

FIG. 2 illustrates a flow chart of a method for PUSCH transmission with repetitions according to some embodiments of the present application. Although the method is illustrated in a system level by a UE in a remote side (or UE side) and a BS in a network side (or BS side), persons skilled in the art should understand that the method implemented in the remote side and that implemented in the network side can be separately implemented and incorporated by other apparatus with the like functions.

In the exemplary method shown in FIG. 2, in step 202, the network side, e.g., a BS 101 as shown in FIG. 1 may schedule a plurality of repetitions of a PUSCH transmission by transmitting DCI in a PDCCH. There is at least one open-loop power control parameter set indication (also referred to as "open-loop power control parameter set indication field") in the DCI scheduling the plurality of repetitions of the PUSCH transmission (also referred to as "PUSCH repetitions"), e.g., one OL-PC PSI field in the DCI or two OL-PC PSI fields in the DCI.

Besides the DCI scheduling the PUSCH transmission, the network side, e.g., the BS 101 as shown in FIG. 1 may also transmit configuration information associated with the scheduled PUSCH transmission in step 204. According to some embodiments of the present application, the configuration information at least indicates: a first SRS resource set and a second SRS resource set, a mapping pattern, and at least one list of P0-PUSCH-Set. Each SRS resource set is associated with one TRP or one beam. Both the first SRS resource set and the second SRS resource set are configured with the same transmission scheme, e.g., both with usage as "codebook" or "non-codebook." Each of the plurality of repetitions is associated with the first SRS resource set or the second SRS resource set based on the mapping pattern, so that a first part of the plurality of PUSCH repetitions is associated with the first SRS resource set and a second part of the plurality of PUSCH repetitions is associated with the second SRS resource set according to the mapping pattern. Herein, the wording "first" and "second" are just for distinguishing the two SRS resource sets and their associated PUSCH repetitions respectively, and should not be understood as the sequence limitation. The mapping pattern for the SRS resource sets and the plurality of PUSCH repetitions can be any mapping pattern, which is similar to a beam mapping pattern of R16 URLLC PDSCH Scheme 4, e.g., the cyclical mapping pattern, or the sequential mapping pattern. Each of the at least one list of P0-PUSCH-Set is a list of P0 set(s) for PUSCH, e.g., is or similar to P0-PUSCH-Set-r16 agreed by 3GPP or a new list of P0-PUSCH-Set developed in the future.

In the remote side, e.g., the UE 102 in FIG. 1, the DCI scheduling the plurality of PUSCH repetitions and the configuration information associated with the scheduled PUSCH transmission may be received in step 203 and 205 respectively. For example, the UE 102 receives DCI scheduling the plurality of PUSCH repetitions, wherein there is at least one open-loop power control parameter set indication in the DCI in step 203. The UE 102 receives the configuration information associated with the PUSCH transmission, indicating: the first SRS resource set and the second SRS resource set, the mapping pattern, and the at least one list of P0-PUSCH-Set, wherein a first part of the plurality of repetitions is associated with the first SRS resource set and a second part of the plurality of repetitions is associated with the second SRS resource set according to the mapping pattern.

In step 207, in the remote side, e.g., the UE 102 in FIG. 1, may transmit the first part of the plurality of PUSCH repetitions according to a first P0 value determined based on the received DCI and configuration information; and transmit the second part of the plurality of repetitions according to a second P0 value determined based on the received DCI and configuration information. Accordingly, the network side, e.g., the BS 101 in FIG. 1 may receive the first part of the plurality of repetitions according to a first P0 value determined based on the received DCI and configuration information; and receive the second part of the plurality of repetitions according to a second P0 value determined based on the received DCI and configuration information in step 206.

Based on the above basic solutions, more details will be illustrated in various embodiments hereafter. Specifically, four exemplary schemes are proposed to enhance open-loop power control for a PUSCH transmission with repetitions according to some embodiments of the present application. In any exemplary scheme, regardless whether there is SRI field(s) in the DCI scheduling a PUSCH transmission with repetitions, there are two SRS resource sets configured for the PUSCH transmission with repetitions. It is assumed that a first part of the plurality of repetitions is associated with the first SRS resource set, and a second part of the plurality of repetitions is associated with the second SRS resource set according to the mapping pattern. The first part of the plurality of repetitions will be transmitted according to a first P0 value, and the second part of the plurality of repetitions will be transmitted according to a second P0 value. In some exemplary schemes, e.g., there is more than one open-loop power control parameter set indication in the DCI scheduling the PUSCH transmission with repetitions, the P0 value for the PUSCH repetition(s) associated with different SRS resource set are separately determined. In addition, in any scheme, when the value of the corresponding one open-loop power control parameter set indication is not that listed for illustration, e.g., being "11," the first P0 value and second P0 value can be determined based on other scheme(s), e.g., the scheme provided in R15, which will not be illustrated herein.

Scheme 1: There is Only One Open-Loop Power Control Parameter Set Indication in the DCI Scheduling PUSCH Repetitions and Only One List of P0-PUSCH-Set is Configured In Scheme 1, the only one open-loop power control parameter set indication (or indication field, e.g., OL-PC PSI) in the DCI is applied for all PUSCH repetitions. Considering that the interpretation and bit width of open-loop power control parameter indication in DCI with SRI field and DCI without SRI field are different, two exemplary solutions are further illustrated.

An exemplary solution according to Scheme 1 is: there is SRI field(s) in the DCI scheduling PUSCH repetitions (Solution 1-1).

According to some embodiments of the present application, there are two SRI fields in the DCI scheduling PUSCH repetitions and a value of the one open-loop power control parameter set indication is '1.' The first P0 value is determined from the first value in the only one list of P0-PUSCH-Set with a first P0-PUSCH-Set-ID value mapped to a first SRI field value, and the second P0 value is determined from the first value in the only one list of P0-PUSCH-Set with a second P0-PUSCH-Set-ID value mapped to a second SRI field value. Herein, the wording "first" used in "a first P0-PUSCH-Set-ID value mapped to a first SRI field value" and "second" used in "a second P0-PUSCH-Set-ID value mapped to a second SRI field value" are just for distinguishing the P0-PUSCH-Set-ID value and SRI field value respectively associated with the determination of the first P0 value and second P0 value, and should not be understood as the sequence limitation. Hereafter the same.

Another exemplary solution according to Scheme 1 is: there is no SRI field in the DCI scheduling PUSCH repetitions (Solution 1-2).

According to some embodiments of the present application, in the case that there is no SRI field in the DCI scheduling PUSCH repetitions and the value of the only one open-loop power control parameter set indication is '1' or '01', both the first P0 value and the second P0 value will be determined from the first value in the only one list of P0-PUSCH-Set with the lowest P0-PUSCH-Set-ID value. According to some other embodiments of the present application, in the case that there is no SRI field in the DCI and the value of the one open-loop power control parameter set indication is '10', both the first P0 value and the second P0 value will be determined from the second value in the only one list of P0-PUSCH-Set with the lowest P0-PUSCH-Set-ID value.

Figure 3:
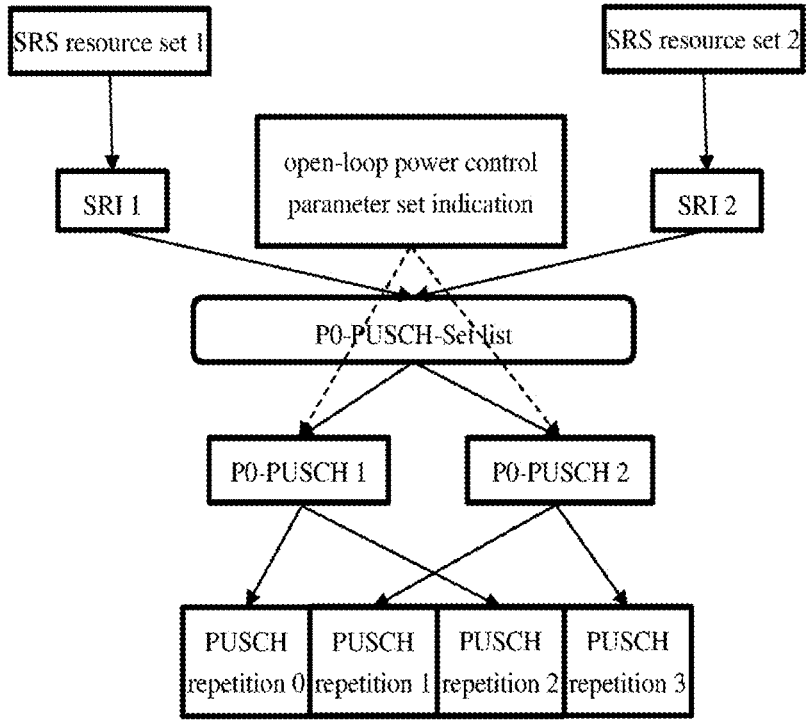
FIG. 3 illustrates an exemplary diagram of determining P0 values for a plurality of PUSCH repetitions by Solution 1-1 according to some embodiments of the present application

FIG. 3 illustrates an exemplary diagram of determining P0 values for a plurality of PUSCH repetitions by Solution 1-1 according to some embodiments of the present application.

As shown in FIG. 3, a PUSCH transmission with 4 repetitions, e.g., PUSCH repetition 0, PUSCH repetition 1, PUSCH repetition 2 and PUSCH repetition 3 is scheduled by DCI in a PDCCH. There are two SRI fields whose values are SRI 1 and SRI 2 respectively in the DCI scheduling the PUSCH transmission, and there is only one list of P0-PUSCH-Set, e.g., P0-PUSCH-Set list is configured. Two SRS resource sets, e.g., SRS resource set 1 and SRS resource set 2 are associated with SRI 1 and SRI 2 respectively, and a cyclical mapping pattern is configured. Accordingly, the first and third repetitions of the PUSCH, i.e., PUSCH repetition 0 and PUSCH repetition 2 are associated with SRS resource set 1, and the second and forth repetitions of the PUSCH, e.g., PUSCH repetition 1 and PUSCH repetition 3 are associated with SRS resource set 2. In addition, there is only one open-loop power control parameter set indication in the DCI scheduling the PUSCH transmission, wherein the first value in P0-PUSCH-Set list with a p0-PUSCH-SetId value mapped to SRI 1 is P0-PUSCH 1, and the first value in P0-PUSCH-Set list with a p0-PUSCH-SetId value mapped to SRI 2 is P0-PUSCH 2. Then, according to Solution 1-1, when the value of the open-loop power control parameter set indication is '1', the P0 value (i.e., first P0 value) of all the PUSCH repetitions associated with SRS resource set 1, i.e., PUSCH repetition 0 and PUSCH repetition 2 is P0-PUSCH 1; and the P0 value (i.e., second P0 value) of all the PUSCH repetitions associated with SRS resource set 2, i.e., PUSCH repetition 1 and PUSCH repetition 3 is P0-PUSCH 2.

Scheme 2: There are Two Open-Loop Power Control Parameter Set Indications in the DCI Scheduling PUSCH Repetitions and Only One List of P0-PUSCH-Set is Configured In Scheme 2, one open-loop power control parameter set indication (or indication field, e.g., OL-PC PSI) is applied per SRS resource set, which means each open-loop power control parameter set indication is associated with one SRS resource set of two SRS resource sets, e.g., by a predefined manner or RRC signalling. In other words, a first one of the two open-loop power control parameter set indications is associated with a first one of the two SRS resource sets, and a second one of the two open-loop power control parameter set indications is associated with the second SRS resource set of the two SRS resource sets. Herein, the wording "first" and "second" are only for distinguishing the two open-loop power control parameter set indications respectively associated with different SRS resource sets, and should not be understood as the sequence limitation. Hereafter the same.

Considering that the interpretation and bit width of open-loop power control parameter indication in DCI with SRI field and DCI without SRI field are different, two exemplary solutions are further illustrated.

An exemplary solution according to Scheme 2 is: there is SRI field(s) in the DCI scheduling PUSCH repetitions (Solution 2-1).

Regarding the first P0 value, according to some embodiments of the present application, there is a first SRI field (only for clear recitation without sequence limitation, hereafter the same) associated with the first SRS resource set in the DCI and a value of the first open-loop power control parameter set indication is '1.' Accordingly, the first P0 value will be determined from the first value in the only one list of P0-PUSCH-Set with a P0-PUSCH-Set-ID value mapped to a value of the first SRI field.

Regarding the second P0 value, according to some embodiments of the present application, there is a second SRI field (only for clear recitation without sequence limitation, hereafter the same) associated with the second SRS resource set in the DCI and a value of the second open-loop power control parameter set indication is '1.' Accordingly, the second P0 value will be determined from the first value in the only one list of P0-PUSCH-Set with a P0-PUSCH-Set-ID value mapped to a value of the second SRI field.

Another exemplary solution according to Scheme 2 is: there is no SRI field in the DCI scheduling PUSCH repetitions (Solution 2-2).

Regarding the first P0 value, according to some embodiments of the present application, the value of the first open-loop power control parameter set indication is '1' or '01', and the first P0 value will be determined from the first value in the only one list of P0-PUSCH-Set with the lowest
P0-PUSCH-Set-ID value. According to some other embodi-
ments of the present application, the value of the first
open-loop power control parameter set indication is '10',
and the first P0 value will be determined from the second
value in the only one list of P0-PUSCH-Set with the lowest
P0-PUSCH-Set-ID value.

Regarding the second P0 value, according to some
embodiments of the present application, the value of the
second open-loop power control parameter set indication is
'1' or '01', and the second P0 value will be determined from
the first value in the only one list of P0-PUSCH-Set with the
lowest P0-PUSCH-Set-ID value. According to some other
embodiments of the present application, the value of the
second open-loop power control parameter set indication is
'10', and the second P0 value will be determined from the
second value in the only one list of P0-PUSCH-Set with the
lowest P0-PUSCH-Set-ID value.

Figure 4:
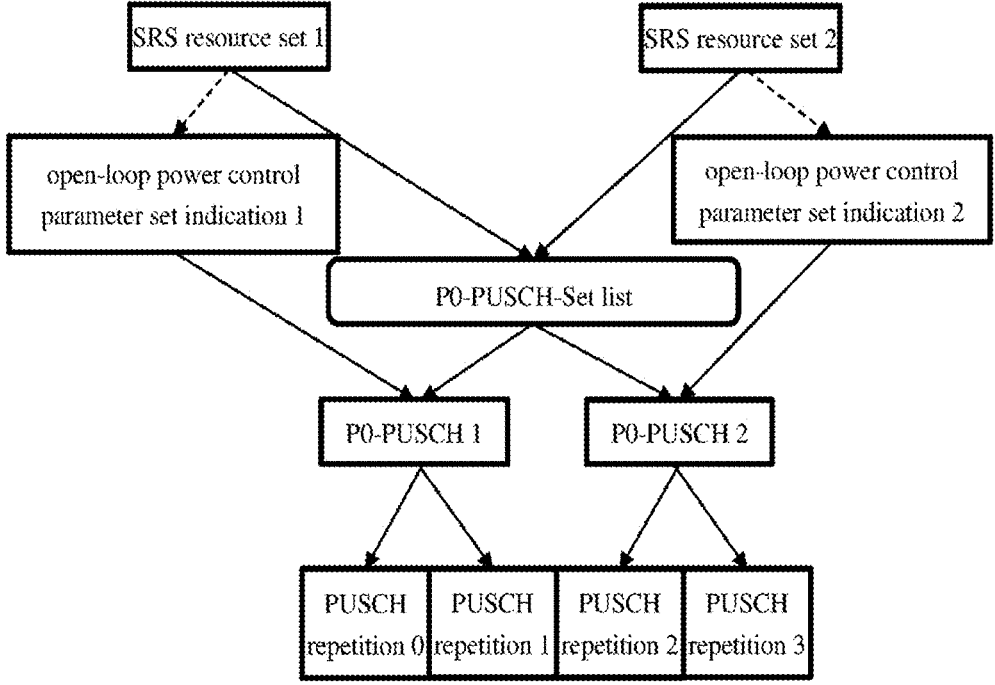
FIG. 4 illustrates an exemplary diagram of determining P0 values for a plurality of PUSCH repetitions by Solution 2-2 according to some embodiments of the present application.

FIG. 4 illustrates an exemplary diagram of determining
P0 values for a plurality of PUSCH repetitions by Solution
2-2 according to some embodiments of the present applica-
tion.

As shown in FIG. 4, a PUSCH transmission with 4
repetitions, e.g., PUSCH repetition 0, PUSCH repetition 1,
PUSCH repetition 2 and PUSCH repetition 3 is scheduled
by DCI in a PDCCH. There is no SRI field in the DCI, and
there is only one list of P0-PUSCH-Set, e.g., P0-PUSCH-Set
list is configured. Two SRS resource sets, e.g., SRS resource
set 1 and SRS resource set 2, and a sequential mapping
pattern are configured. Accordingly, the first and second
PUSCH repetitions, i.e., PUSCH repetition 0 and PUSCH
repetition 1 are associated with SRS resource set 1, and the
third and fourth PUSCH repetitions, i.e., PUSCH repetition
2 and PUSCH repetition 3 are associated with SRS resource
set 2. In addition, there are two open-loop power control
parameter set indications in the DCI scheduling the PUSCH
transmission, wherein open-loop power control parameter
set indication 1 is associated with SRS resource set 1 and
open-loop power control parameter set indication 2 is asso-
ciated with SRS resource set 2. It is assumed that the first
value in P0-PUSCH-Set list with the lowest p0-PUSCH-
SetId value is P0-PUSCH 1, and the second value in
P0-PUSCH-Set list with the lowest p0-PUSCH-SetId value
is P0-PUSCH 2. For the first P0 value associated with SRS
resource 1, it is assumed that open-loop power control
parameter set indication 1 is '01', and then the first P0 value
will be determined from the first value in P0-PUSCH-Set list
with the lowest p0-PUSCH-SetID value, which is
P0-PUSCH 1. For the second P0 value associated with SRS
resource 2, it is assumed that open-loop power control
parameter set indication 2 is '10', and then the second P0
value will be determined from the second value in
P0-PUSCH-Set list with the lowest p0-PUSCH-SetID value,
which is P0-PUSCH 2. Therefore, the P0 value of all the
repetitions associated with SRS resource set 1, i.e., PUSCH
repetition 0 and PUSCH repetition 1 is P0-PUSCH 1, and
the P0 value of all the repetitions associate with SRS
resource set 2, i.e., PUSCH repetition 2 and PUSCH rep-
etition 3 is P0-PUSCH 2.

Scheme 3: There is Only One Open-Loop Power Control
Parameter Set Indication in the DCI Scheduling PUSCH
Repetitions and Two Lists of P0-PUSCH-Set are Configured In Scheme 3, the only one open-loop power control
parameter set indication (or indication field, e.g., OL-PC
PSI) in the DCI is applied for all PUSCH repetitions. Each
P0-PUSCH-Set list is associated with a corresponding SRS
resource set by a predefined manner or RRC signalling, for example, a first P0-PUSCH-Set list is associated with a first
SRS resource set and a second P0-PUSCH-Set list is asso-
ciated with the second SRS resource set.

Considering that the interpretation and bit width of open-
loop power control parameter indication in DCI with SRI
field and DCI without SRI field are different, two exemplary
solutions are further illustrated.

An exemplary solution according to Scheme 3 is: there is
SRI field(s) in the DCI scheduling PUSCH repetitions
(Solution 3-1).

According to some embodiments of the present applica-
tion, in the case that there are two SRI fields in the DCI
scheduling PUSCH repetitions and the value of the one
open-loop power control parameter set indication is '1', the
first P0 value will be determined from the first value in the
first P0-PUSCH-Set list with a first P0-PUSCH-Set-ID value
mapped to a first SRI field value, and the second P0 value
will be determined from the first value in the second
P0-PUSCH-Set list with a second P0-PUSCH-Set-ID value
mapped to a second SRI field value.

Another exemplary solution according to Scheme 3 is:
there is no SRI field in the DCI scheduling PUSCH repeti-
tions (Solution 3-2).

According to some embodiments of the present applica-
tion, in the case that there is no SRI field in the DCI and the
value of the one open-loop power control parameter set
indication is '1' or '01', the first P0 value will be determined
from the first value in the first P0-PUSCH-Set list with a first
(only for clear recitation without sequence limitation, here-
after the same) lowest P0-PUSCH-Set-ID value and the
second P0 value will be determined from the first value in
the second P0-PUSCH-Set list with a second (only for clear
recitation without sequence limitation, hereafter the same)
lowest P0-PUSCH-Set-ID value. According to some other
embodiments of the present application, in the case that
there is no SRI field in the DCI and the value of the one
open-loop power control parameter set indication is '10,' the
first P0 value will be determined from the second value in
the first P0-PUSCH-Set list with the first lowest P0-PUSCH-
Set-ID value, and the second P0 value will be determined
from the second value in the second P0-PUSCH-Set list with
the second lowest P0-PUSCH-Set-ID value.

Figure 5:
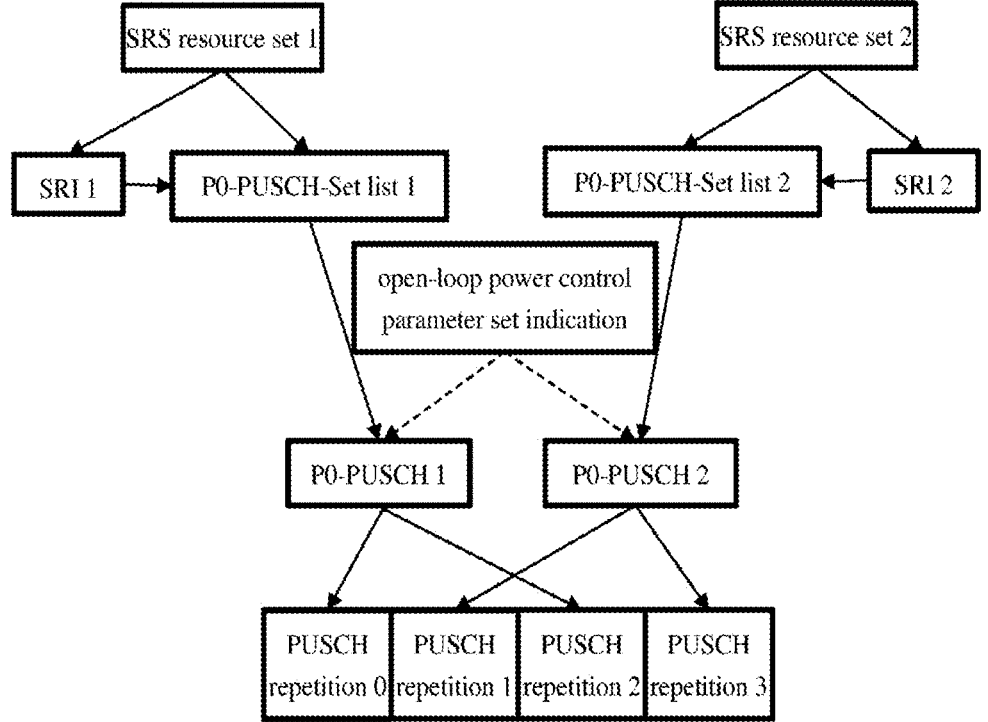
FIG. 5 illustrates an exemplary diagram of determining P0 values for a plurality of PUSCH repetitions by Solution 3-1 according to some embodiments of the present application.

FIG. 5 illustrates an exemplary diagram of determining
P0 values for a plurality of PUSCH repetitions by Solution
3-1 according to some embodiments of the present applica-
tion.

As shown in FIG. 5, a PUSCH transmission with 4
repetitions, e.g., PUSCH repetition 0, PUSCH repetition 1,
PUSCH repetition 2 and PUSCH repetition 3 is scheduled
by DCI in a PDCCH. Two SRS resource sets, e.g., SRS
resource set 1 and SRS resource set 2 are associated with
SRI 1 and SRI 2 respectively, and a cyclical mapping pattern
is configured. Accordingly, the first and third repetitions of
the PUSCH, i.e., PUSCH repetition 0 and PUSCH repetition
2 are associated with SRS resource set 1, and the second and
forth repetitions of the PUSCH, e.g., PUSCH repetition 1
and PUSCH repetition 3 are associated with SRS resource
set 2. In addition, two lists of P0-PUSCH-Set are configured,
wherein P0-PUSCH-Set list 1 is associated with SRS
resource set 1 and P0-PUSCH-Set list 2 is associated with
SRS resource set 2. In addition, the first value in
P0-PUSCH-Set list 1 with a p0-PUSCH-Set-ID value
mapped to SRI 1 is P0-PUSCH 1, and the first value in
P0-PUSCH-Set list 2 with a p0-PUSCH-Set-ID value
mapped to SRI 2 is P0-PUSCH 2. Then, according to
Solution 3-1, when the value of open-loop power control
parameter set indication is '1', the P0 value (first P0 value)

of all the PUSCH repetitions associated with SRS resource set 1, i.e., PUSCH repetition 0 and PUSCH repetition 2 is P0-PUSCH 1; and the P0 value (second P0 value) of all the PUSCH repetitions associated with SRS resource set 2, i.e., PUSCH repetition 1 and PUSCH repetition 3 is P0-PUSCH 2.

Scheme 4: There are Two Open-Loop Power Control Parameter Set Indications in the DCI Scheduling PUSCH Repetitions and Two Lists of P0-PUSCH-Set are Configured In Scheme 4, one open-loop power control parameter set indication (or indication field, e.g., OL-PC PSI) is applied per SRS resource set, which means each open-loop power control parameter set indication is associated with one SRS resource set of two SRS resource sets, e.g., by a predefined manner or RRC signalling. In other words, a first one of the two open-loop power control parameter set indications is associated with a first one of the two SRS resource sets, and a second one of the two open-loop power control parameter set indications is associated with the second SRS resource set of the two SRS resource sets. Similarly, each P0-PUSCH-Set list is associated with a corresponding SRS resource set by a predefined manner or RRC signalling, for example, a first P0-PUSCH-Set list is associated with a first SRS resource set and a second P0-PUSCH-Set list is associated with the second SRS resource set.

Considering that the interpretation and bit width of open-loop power control parameter indication in DCI with SRI field and DCI without SRI field are different, two exemplary solutions are further illustrated.

An exemplary solution according to Scheme 4 is: there is SRI field(s) in the DCI scheduling PUSCH repetitions (Solution 4-1).

Regarding the first P0 value, according to some embodiments of the present application, in the case that there is a first SRI field associated with the first SRS resource set in the DCI and a value of the first open-loop power control parameter set indication is '1', the first P0 value will be determined from the first value in the first P0-PUSCH-Set list with a P0-PUSCH-Set-ID value mapped to a value of the first SRI field.

Regarding the second P0 value, according to some embodiments of the present application, in the case that there is a second SRI field associated with the second SRS resource set in the DCI and a value of the second open-loop power control parameter set indication is '1', the second P0 value will be determined from the first value in the second P0-PUSCH-Set list with a P0-PUSCH-Set-ID value mapped to a value of the second SRI field.

Another exemplary solution according to Scheme 4 is: there is no SRI field in the DCI scheduling PUSCH repetitions (Solution 4-2).

Regarding the first P0 value, according to some embodiments of the present application, in the case that there is no SRI field associated with the first SRS resource set in the DCI and the value of the first open-loop power control parameter set indication is '1' or '01', the first P0 value will be determined from the first value in the first P0-PUSCH-Set list with the lowest P0-PUSCH-Set-ID value. According to some other embodiments of the present application, in the case that there is no SRI field associated with the first SRS resource set in the DCI and the value of the first open-loop power control parameter set indication is '10', the first P0 value will be determined from the second value in the first P0-PUSCH-Set list with the lowest P0-PUSCH-Set-ID value.

Regarding the second P0 value, according to some embodiments of the present application, in the case that there is no SRI field associated with the second SRS resource set in the DCI and the value of the second open-loop power control parameter set indication is '1' or '01', the second P0 value will be determined from the first value in the second P0-PUSCH-Set list with the lowest second P0-PUSCH-Set-ID value. According to some other embodiments of the present application, in the case that there is no SRI field associated with the SRS resource set in the DCI and the value of the second open-loop power control parameter set indication is '10', the second P0 value will be determined from the second value in the second P0-PUSCH-Set list with the lowest P0-PUSCH-Set-ID value.

Figure 6:
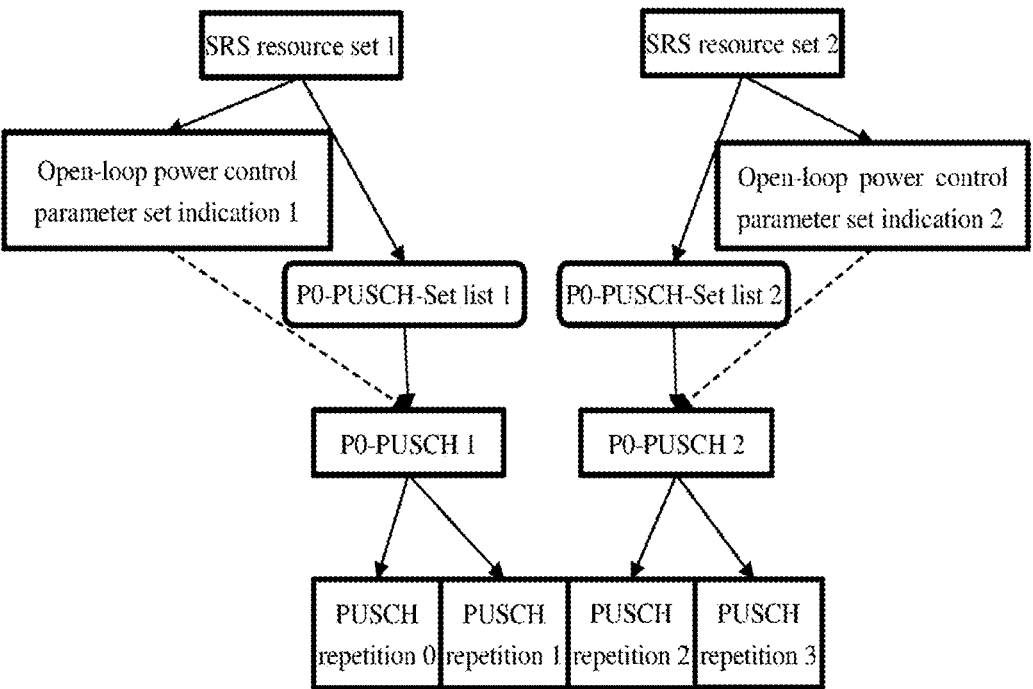
FIG. 6 illustrates an exemplary diagram of determining P0 values for a plurality of PUSCH repetitions by Solution 4-2 according to some embodiments of the present application.

FIG. 6 illustrates an exemplary diagram of determining P0 values for a plurality of PUSCH repetitions by Solution 4-2 according to some embodiments of the present application.

As shown in FIG. 6, a PUSCH transmission with 4 repetitions, e.g., PUSCH repetition 0, PUSCH repetition 1, PUSCH repetition 2 and PUSCH repetition 3 is scheduled by DCI in a PDCCH. There is no SRI field in the DCI scheduling the PUSCH transmission. Two SRS resource sets, e.g., SRS resource set 1 and SRS resource set 2, and a sequential mapping pattern are configured. Accordingly, the first and second PUSCH repetitions, i.e., PUSCH repetition 0 and PUSCH repetition 1 are associated with SRS resource set 1, and the third and fourth PUSCH repetitions, e.g., PUSCH repetition 2 and PUSCH repetition 3 are associated with SRS resource set 2. There are two open-loop power control parameter set indications in the DCI scheduling the PUSCH transmission, wherein open-loop power control parameter set indication 1 is associated with SRS resource set 1 and open-loop power control parameter set indication 2 is associated with SRS resource set 2. In addition, two lists of P0-PUSCH-Set are configured, wherein P0-PUSCH-Set list 1 is associated with SRS resource set 1 and P0-PUSCH-Set list 2 is associated with SRS resource set 2. The first value in P0-PUSCH-Set list 1 with the lowest p0-PUSCH-SetId value is P0-PUSCH 1, and the first value in P0-PUSCH-Set list 2 with the lowest p0-PUSCH-SetId value is P0-PUSCH 2. Then, according to Solution 4-2, for the first P0 value associated with SRS resource 1, when open-loop power control parameter set indication 1 is '1', the first P0 value will be determined from the first value in P0-PUSCH-Set list 1 with the lowest p0-PUSCH-SetID value, which is P0-PUSCH 1. For the second P0 value associated with SRS resource 2, when open-loop power control parameter set indication 2 is '1', the second P0 value will be determined from the second value in P0-PUSCH-Set list 2 with the lowest p0-PUSCH-SetID value, which is P0-PUSCH 2. Therefore, the P0 value of all the repetitions associated with SRS resource set 1, i.e., PUSCH repetition 0 and PUSCH repetition 1 is P0-PUSCH 1, and the P0 value of all the repetitions associate with SRS resource set 2, i.e., PUSCH repetition 2 and PUSCH repetition 3 is P0-PUSCH 2.

Embodiments of the present application also propose an apparatus for PUSCH transmission with repetition. For example, FIG. 7 illustrates a block diagram of an apparatus 700 for PUSCH transmission with repetitions according to some embodiments of the present application.

Figure 7:
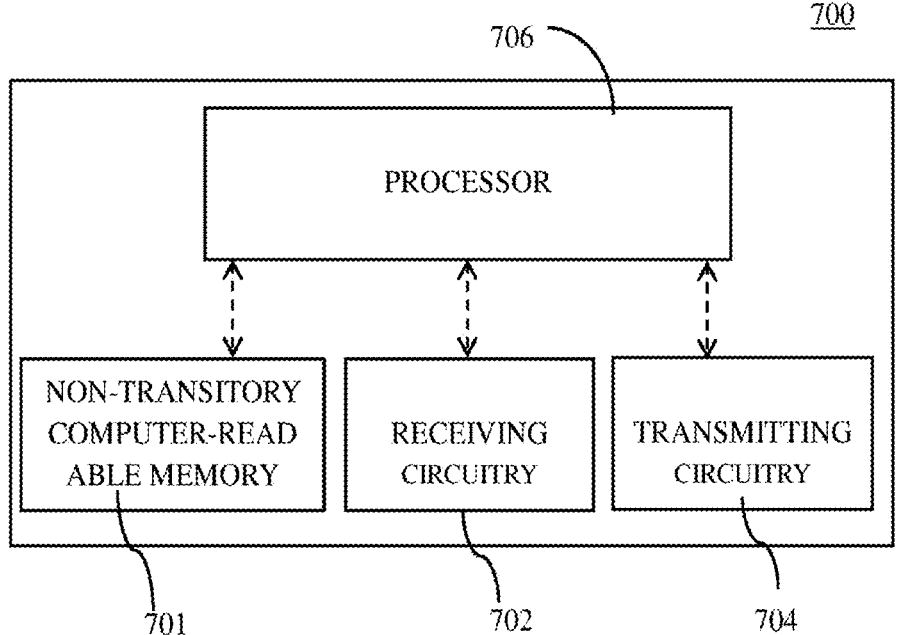
FIG. 7 illustrates a simplified block diagram of an apparatus for multiplexing uplink resources according to some embodiments of the present application.

As shown in FIG. 7, the apparatus 700 may include at least one non-transitory computer-readable medium 701, at least one receiving circuitry 702, at least one transmitting circuitry 704, and at least one processor 706 coupled to the non-transitory computer-readable medium 701, the receiving circuitry 702 and the transmitting circuitry 704. The apparatus 700 may be a network side apparatus (e.g., a BS)

configured to perform a method illustrated in any one of FIGS. 2-6 and the like, or a remote unit (e.g., a UE) configured to perform a method illustrated in any one of FIGS. 2-6 or the like.

Although in this figure, elements such as the at least one processor 706, transmitting circuitry 704, and receiving circuitry 702 are described in the singular, the plural is contemplated unless a limitation to the singular is explicitly stated. In some embodiments of the present application, the receiving circuitry 702 and the transmitting circuitry 704 can be combined into a single device, such as a transceiver. In certain embodiments of the present application, the apparatus 700 may further include an input device, a memory, and/or other components.

For example, in some embodiments of the present application, the non-transitory computer-readable medium 701 may have stored thereon computer-executable instructions to cause a processor to implement the method with respect to the UE as described above. For example, the computer-executable instructions, when executed, cause the processor 706 interacting with receiving circuitry 702 and transmitting circuitry 704, so as to perform the steps with respect to the UE depicted in FIG. 2.

In some embodiments of the present application, the non-transitory computer-readable medium 701 may have stored thereon computer-executable instructions to cause a processor to implement the method with respect to the BS as described above. For example, the computer-executable instructions, when executed, cause the processor 706 interacting with receiving circuitry 702 and transmitting circuitry 704, so as to perform the steps with respect to the BS depicted in FIG. 2.

The method according to embodiments of the present application can also be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this application. For example, an embodiment of the present application provides an apparatus for PUSCH transmission with repetition, including a processor and a memory. Computer programmable instructions for implementing a method are stored in the memory, and the processor is configured to perform the computer programmable instructions to implement the method. The method may be a method as stated above or other method according to an embodiment of the present application.

An alternative embodiment preferably implements the methods according to embodiments of the present application in a non-transitory, computer-readable storage medium storing computer programmable instructions. The instructions are preferably executed by computer-executable components preferably integrated with a network security system. The non-transitory, computer-readable storage medium may be stored on any suitable computer readable media such as RAMs, ROMs, flash memory, EEPROMs, optical storage devices (CD or DVD), hard drives, floppy drives, or any suitable device. The computer-executable component is preferably a processor but the instructions may alternatively or additionally be executed by any suitable dedicated hardware device. For example, an embodiment of the present application provides a non-transitory, computer-readable storage medium having computer programmable instructions stored therein. The computer programmable instructions are configured to implement a method as stated above or other method according to an embodiment of the present application.

In addition, in this disclosure, relational terms such as "first," "second," and the like may be used solely to distinguish one entity or action from another entity or action without necessarily requiring or implying any actual such relationship or order between such entities or actions. The terms "includes," "including," or any other variation thereof, are intended to cover a non-exclusive inclusion, such that a process, method, article, or apparatus that includes a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that includes the element. Also, the term "another" is defined as at least a second or more. The terms "having," and the like, as used herein, are defined as "including."

What is claimed is:

1. A method performed by a user equipment (UE), the method comprising:

receiving downlink control information (DCI) scheduling a plurality of repetitions of a physical uplink shared channel (PUSCH) transmission, the DCI including at least one open-loop power control parameter set indication;

receiving configuration information associated with the PUSCH transmission, the configuration information indicating a first sounding reference signal (SRS) resource set and a second SRS resource set, a mapping pattern, and at least one list of P0-PUSCH-Set, wherein a first part of the plurality of repetitions is associated with the first SRS resource set and a second part of the plurality of repetitions is associated with the second SRS resource set according to the mapping pattern;

transmitting the first part of the plurality of repetitions according to a first P0 value determined based on the received DCI and configuration information; and transmitting the second part of the plurality of repetitions according to a second P0 value determined based on the received DCI and configuration information.

2. The method of claim 1, wherein the DCI includes one open-loop power control parameter set indication and the configuration information indicates one list of P0-PUSCH-Set; and the method further comprising at least one of:

if the DCI includes two SRS resource indicator (SRI) fields and a value of the one open-loop power control parameter set indication is '1', determining the first P0 value from a first value in the one list of P0-PUSCH-Set with a first P0-PUSCH-Set-ID value mapped to a first SRI field value, and determining the second P0 value from a first value in the one list of P0-PUSCH-Set with a second P0-PUSCH-Set-ID value mapped to a second SRI field value;

if the DCI does not include a SRI field and the value of the one open-loop power control parameter set indication is '1' or '01', determining the first P0 value and the second P0 value from a first value in the one list of P0-PUSCH-Set with a lowest P0-PUSCH-Set-ID value; or if the DCI does not include a SRI field and the value of the one open-loop power control parameter set indication is '10', determining the first P0 value and the second P0 value from a second value in the one list of P0-PUSCH-Set with the lowest P0-PUSCH-Set-ID value.

3. The method of claim 1, wherein:

the DCI includes two open-loop power control parameter set indications and the configuration information indicates one list of P0-PUSCH-Set;

a first open-loop power control parameter set indication is associated with the first SRS resource set and a second open-loop power control parameter set indication is associated with the second SRS resource set; and the method further comprising at least one of:

if the DCI includes a first SRS resource indicator (SRI) field associated with the first SRS resource set and a value of the first open-loop power control parameter set indication is '1', determining the first P0 value from a first value in the one list of P0-PUSCH-Set with a P0-PUSCH-Set-ID value mapped to a value of the first SRI field;

if the DCI does not include a SRI field associated with the first SRS resource set and the value of the first open-loop power control parameter set indication is '1' or '01', determining the first P0 value from a first value in the one list of P0-PUSCH-Set with a lowest P0-PUSCH-Set-ID value; or if the DCI does not include a SRI field associated with the first SRS resource set and the value of the first open-loop power control parameter set indication is '10', determining the first P0 value from a second value in the one list of P0-PUSCH-Set with the lowest P0-PUSCH-Set-ID value.

4. The method of claim 1, wherein:

the DCI includes two open-loop power control parameter set indications and the configuration information indicates one list of P0-PUSCH-Set;

a first open-loop power control parameter set indication is associated with the first SRS resource set and a second open-loop power control parameter set indication is associated with the second SRS resource set; and the method further comprising at least one of:

if the DCI includes a second SRS resource indicator (SRI) field associated with the second SRS resource set and a value of the second open-loop power control parameter set indication is '1', determining the second P0 value from a first value in the one list of P0-PUSCH-Set with a P0-PUSCH-Set-ID value mapped to a value of the second SRI field;

if the DCI does not include a SRI field associated with the second SRS resource set and the value of the second open-loop power control parameter set indication is '1' or '01', determining the second P0 value from a first value in the one list of P0-PUSCH-Set with a lowest P0-PUSCH-Set-ID value; or if the DCI does not include a SRI field associated with the second SRS resource set and the value of the second open-loop power control parameter set indication is '10', determining the second P0 value from a second value in the one list of P0-PUSCH-Set with the lowest P0-PUSCH-Set-ID value.

5. The method of claim 1, wherein:

the DCI includes one open-loop power control parameter set indication and the configuration information indicates two lists of P0-PUSCH-Set;

a first P0-PUSCH-Set list is associated with the first SRS resource set and a second P0-PUSCH-Set list is associated with the second SRS resource set; and the method further comprising at least one of:

if the DCI includes two SRS resource indicator (SRI) fields and a value of the one open-loop power control parameter set indication is '1', determining the first P0 value from a first value in the first P0-PUSCH-Set list with a first P0-PUSCH-Set-ID value mapped to a first SRI field value, and determining the second P0 value from a first value in the second P0-PUSCH-Set list with a second P0-PUSCH-Set-ID value mapped to a second SRI field value;

if the DCI does not include a SRI field and the value of the one open-loop power control parameter set indication is '1' or '01', determining the first P0 value from a first value in the first P0-PUSCH-Set list with a first lowest P0-PUSCH-Set-ID value and determining the second P0 value from a first value in the second P0-PUSCH-Set list with a second lowest P0-PUSCH-Set-ID value; or if the DCI does not include a SRI field and the value of the one open-loop power control parameter set indication is '10,' determining the first P0 value from a second value in the first P0-PUSCH-Set list with the first lowest P0-PUSCH-Set-ID value and determining the second P0 value from a second value in the second P0-PUSCH-Set list with the second lowest P0-PUSCH-Set-ID value.

6. The method of claim 1, wherein:

the DCI includes two open-loop power control parameter set indications and the configuration information indicates two lists of P0-PUSCH-Set;

a first open-loop power control parameter set indication and a first P0-PUSCH-Set list are associated with the first SRS resource set, and a second open-loop power control parameter set indication and a second P0-PUSCH-Set list are associated with the second SRS resource set; and the method further comprising at least one of:

if the DCI includes a first SRS resource indicator (SRI) field associated with the first SRS resource set and a value of the first open-loop power control parameter set indication is '1', determining the first P0 value from a first value in the first P0-PUSCH-Set list with a P0-PUSCH-Set-ID value mapped to a value of the first SRI field;

if the DCI does not include a SRI field associated with the first SRS resource set and the value of the first open-loop power control parameter set indication is '1' or '01', determining the first P0 value from a first value in the first P0-PUSCH-Set list with a lowest P0-PUSCH-Set-ID value; or if the DCI does not include a SRI field associated with the first SRS resource set and the value of the first open-loop power control parameter set indication is '10', determining the first P0 value from a second value in the first P0-PUSCH-Set list with the lowest P0-PUSCH-Set-ID value.

7. The method of claim 1, wherein:

the DCI includes two open-loop power control parameter set indications and the configuration information indicates two lists of P0-PUSCH-Set;

a first open-loop power control parameter set indication and a first P0-PUSCH-Set list are associated with the first SRS resource set, and a second open-loop power control parameter set indication and a second P0-PUSCH-Set list are associated with the second SRS resource set; and the method further comprising at least one of:

if the DCI includes a second SRS resource indicator (SRI) field associated with the second SRS resource set and a value of the second open-loop power control parameter set indication is '1', determining the second P0 value from a first value in the second P0-PUSCH-Set list with a P0-PUSCH-Set-ID value mapped to a value of the second SRI field;

if the DCI does not include a SRI field associated with the second SRS resource set and the value of the second open-loop power control parameter set indication is '1' or '01', determining the second P0 value from a first value in the second P0-PUSCH-Set list with a lowest P0-PUSCH-Set-ID value; or if the DCI does not include a SRI field associated with the second SRS resource set and the value of the second open-loop power control parameter set indication is '10', determining the second P0 value from a second value in the second P0-PUSCH-Set list with the lowest P0-PUSCH-Set-ID value.

8. A base station for wireless communication, comprising:
at least one memory; and
at least one processor coupled with the at least one memory and configured to cause the base station to:
transmit downlink control information (DCI) scheduling a plurality of repetitions of a physical uplink shared channel (PUSCH) transmission, the DCI including at least one open-loop power control parameter set indication;
transmit configuration information associated with the PUSCH transmission, the configuration information indicating a first sounding reference signal (SRS) resource set and a second SRS resource set, a mapping pattern, and at least one list of P0-PUSCH-Set, wherein a first part of the plurality of repetitions is associated with the first SRS resource set and a second part of the plurality of repetitions is associated with the second SRS resource set according to the mapping pattern;
receive the first part of the plurality of repetitions according to a first P0 value determined based on the received DCI and configuration information; and
receive the second part of the plurality of repetitions according to a second P0 value determined based on the received DCI and configuration information.

9. The base station of claim 8, wherein the DCI includes one open-loop power control parameter set indication and the configuration information indicates one list of P0-PUSCH-Set; and the at least one processor is configured to cause the base station to at least one of:
if the DCI includes two SRS resource indicator (SRI) fields and a value of the one open-loop power control parameter set indication is '1', determine the first P0 value from a first value in the one list of P0-PUSCH-Set with a first P0-PUSCH-Set-ID value mapped to a first SRI field value, and determine the second P0 value from a first value in the one list of P0-PUSCH-Set with a second P0-PUSCH-Set-ID value mapped to a second SRI field value;

if the DCI does not include a SRI field and the value of the one open-loop power control parameter set indication is '1' or '01', determine the first P0 value and the second P0 value from a first value in the one list of P0-PUSCH-Set with a lowest P0-PUSCH-Set-ID value; or if the DCI does not include a SRI field and the value of the one open-loop power control parameter set indication is '10', determine the first P0 value and the second P0 value from a second value in the one list of P0-PUSCH-Set with the lowest P0-PUSCH-Set-ID value.

10. The base station of claim 8, wherein:
the DCI includes two open-loop power control parameter set indications and the configuration information indicates one list of P0-PUSCH-Set;
a first open-loop power control parameter set indication is associated with the first SRS resource set and a second open-loop power control parameter set indication is associated with the second SRS resource set; and
the at least one processor is configured to cause the base station to at least one of:
if the DCI includes a first SRS resource indicator (SRI) field associated with the first SRS resource set and a value of the first open-loop power control parameter set indication is '1', determine the first P0 value from a first value in the one list of P0-PUSCH-Set with a P0-PUSCH-Set-ID value mapped to a value of the first SRI field;

if the DCI does not include a SRI field associated with the first SRS resource set and the value of the first open-loop power control parameter set indication is '1' or '01', determine the first P0 value from a first value in the one list of P0-PUSCH-Set with a lowest P0-PUSCH-Set-ID value; or if the DCI does not include a SRI field associated with the first SRS resource set and the value of the first open-loop power control parameter set indication is '10', determine the first P0 value from a second value in the one list of P0-PUSCH-Set with the lowest P0-PUSCH-Set-ID value.

11. The base station of claim 8, wherein:
the DCI includes two open-loop power control parameter set indications and the configuration information indicates one list of P0-PUSCH-Set;
a first open-loop power control parameter set indication is associated with the first SRS resource set and a second open-loop power control parameter set indication is associated with the second SRS resource set; and
the at least one processor is configured to cause the base station to at least one of:
if the DCI includes a second SRS resource indicator (SRI) field associated with the second SRS resource set and a value of the second open-loop power control parameter set indication is '1', determine the second P0 value from a first value in the one list of P0-PUSCH-Set with a P0-PUSCH-Set-ID value mapped to a value of the second SRI field;

if the DCI does not include a SRI field associated with the second SRS resource set and the value of the second open-loop power control parameter set indication is '1' or '01', determine the second P0 value from a first value in the one list of P0-PUSCH-Set with a lowest P0-PUSCH-Set-ID value; or if the DCI does not include a SRI field associated with the second SRS resource set and the value of the second open-loop power control parameter set indication is '10', determine the second P0 value from a second value in the one list of P0-PUSCH-Set with the lowest P0-PUSCH-Set-ID value.

12. The base station of claim 8, wherein:
the DCI includes one open-loop power control parameter set indication and the configuration information indicates two lists of P0-PUSCH-Set;

a first P0-PUSCH-Set list is associated with the first SRS resource set and a second P0-PUSCH-Set list is associated with the second SRS resource set; and the at least one processor is configured to cause the base station to at least one of:

if the DCI includes two SRS resource indicator (SRI) fields and a value of the one open-loop power control parameter set indication is '1', determine the first P0 value from a first value in the first P0-PUSCH-Set list with a first P0-PUSCH-Set-ID value mapped to a first SRI field value, and determine the second P0 value from a first value in the second P0-PUSCH-Set list with a second P0-PUSCH-Set-ID value mapped to a second SRI field value;

if the DCI does not include a SRI field and the value of the one open-loop power control parameter set indication is '1' or '01', determine the first P0 value from a first value in the first P0-PUSCH-Set list with a first lowest P0-PUSCH-Set-ID value and determine the second P0 value from a first value in the second P0-PUSCH-Set list with a second lowest P0-PUSCH-Set-ID value; or if the DCI does not include a SRI field in the DCI and the value of the one open-loop power control parameter set indication is '10,' determine the first P0 value from a second value in the first P0-PUSCH-Set list with the first lowest P0-PUSCH-Set-ID value and determine the second P0 value from a second value in the second P0-PUSCH-Set list with the second lowest P0-PUSCH-Set-ID value.

13. A user equipment (UE) for wireless communication, comprising:

at least one memory; and at least one processor coupled with the at least one memory and configured to cause the UE to:

receive downlink control information (DCI) scheduling a plurality of repetitions of a physical uplink shared channel (PUSCH) transmission, the DCI including at least one open-loop power control parameter set indication;

receive configuration information associated with the PUSCH transmission, the configuration information indicating a first sounding reference signal (SRS) resource set and a second SRS resource set, a mapping pattern, and at least one list of P0-PUSCH-Set, wherein a first part of the plurality of repetitions is associated with the first SRS resource set and a second part of the plurality of repetitions is associated with the second SRS resource set according to the mapping pattern;

transmit the first part of the plurality of repetitions according to a first P0 value determined based on the received DCI and configuration information; and transmit the second part of the plurality of repetitions according to a second P0 value determined based on the received DCI and configuration information.

14. The UE of claim 13, wherein the DCI includes one open-loop power control parameter set indication and the configuration information indicates one list of P0-PUSCH-Set; and the at least one processor is configured to cause the UE to at least one of:

if the DCI includes two SRS resource indicator (SRI) fields and a value of the one open-loop power control parameter set indication is '1', determine the first P0 value from a first value in the one list of P0-PUSCH-Set with a first P0-PUSCH-Set-ID value mapped to a first SRI field value, and determine the second P0 value from a first value in the one list of P0-PUSCH-Set with a second P0-PUSCH-Set-ID value mapped to a second SRI field value;

if the DCI does not include a SRI field and the value of the one open-loop power control parameter set indication is '1' or '01', determine the first P0 value and the second P0 value from a first value in the one list of P0-PUSCH-Set with a lowest P0-PUSCH-Set-ID value; or if the DCI does not include a SRI field and the value of the one open-loop power control parameter set indication is '10', determine the first P0 value and the second P0 value from a second value in the one list of P0-PUSCH-Set with the lowest P0-PUSCH-Set-ID value.

15. The UE of claim 13, wherein:

the DCI includes two open-loop power control parameter set indications and the configuration information indicates one list of P0-PUSCH-Set;

a first open-loop power control parameter set indication is associated with the first SRS resource set and a second open-loop power control parameter set indication is associated with the second SRS resource set; and the at least one processor is configured to cause the UE to at least one of:

if the DCI includes a first SRS resource indicator (SRI) field associated with the first SRS resource set and a value of the first open-loop power control parameter set indication is '1', determine the first P0 value from a first value in the one list of P0-PUSCH-Set with a P0-PUSCH-Set-ID value mapped to a value of the first SRI field;

if the DCI does not include a SRI field associated with the first SRS resource set and the value of the first open-loop power control parameter set indication is '1' or '01', determine the first P0 value from a first value in the one list of P0-PUSCH-Set with a lowest P0-PUSCH-Set-ID value; or if the DCI does not include a SRI field associated with the first SRS resource set and the value of the first open-loop power control parameter set indication is '10', determine the first P0 value from a second value in the one list of P0-PUSCH-Set with the lowest P0-PUSCH-Set-ID value.

16. The UE of claim 13, wherein:

the DCI includes two open-loop power control parameter set indications and the configuration information indicates one list of P0-PUSCH-Set;

a first open-loop power control parameter set indication is associated with the first SRS resource set and a second open-loop power control parameter set indication is associated with the second SRS resource set; and the at least one processor is configured to cause the UE to at least one of:

if the DCI includes a second SRS resource indicator (SRI) field associated with the second SRS resource set and a value of the second open-loop power control parameter set indication is '1', determine the second P0 value from a first value in the one list of P0-PUSCH-Set with a P0-PUSCH-Set-ID value mapped to a value of the second SRI field;

if the DCI does not include a SRI field associated with the second SRS resource set and the value of the second open-loop power control parameter set indication is '1' or '01', determine the second P0 value from a first value in the one list of P0-PUSCH-Set with a lowest P0-PUSCH-Set-ID value; or if the DCI does not include a SRI field associated with the second SRS resource set and the value of the second open-loop power control parameter set indication is '10', determine the second P0 value from a second value in the one list of P0-PUSCH-Set with the lowest P0-PUSCH-Set-ID value.

17. The UE of claim 13, wherein:

the DCI includes one open-loop power control parameter set indication and the configuration information indicates two lists of P0-PUSCH-Set;

a first P0-PUSCH-Set list is associated with the first SRS resource set and a second P0-PUSCH-Set list is associated with the second SRS resource set; and the at least one processor is configured to cause the UE to at least one of:

if the DCI includes two SRS resource indicator (SRI) fields and a value of the one open-loop power control parameter set indication is '1', determine the first P0 value from a first value in the first P0-PUSCH-Set list with a first P0-PUSCH-Set-ID value mapped to a first SRI field value, and determine the second P0 value from a first value in the second P0-PUSCH-Set list with a second P0-PUSCH-Set-ID value mapped to a second SRI field value;

if the DCI does not include a SRI field and the value of the one open-loop power control parameter set indication is '1' or '01', determine the first P0 value from a first value in the first P0-PUSCH-Set list with a first lowest P0-PUSCH-Set-ID value and determine the second P0 value from a first value in the second P0-PUSCH-Set list with a second lowest P0-PUSCH-Set-ID value; or if the DCI does not include a SRI field and the value of the one open-loop power control parameter set indication is '10,' determine the first P0 value from a second value in the first P0-PUSCH-Set list with the first lowest P0-PUSCH-Set-ID value and determine the second P0 value from a second value in the second P0-PUSCH-Set list with the second lowest P0-PUSCH-Set-ID value.

18. The UE of claim 13, wherein:

the DCI includes two open-loop power control parameter set indications and the configuration information indicates two lists of P0-PUSCH-Set;

a first open-loop power control parameter set indication and a first P0-PUSCH-Set list are associated with the first SRS resource set, and a second open-loop power control parameter set indication and a second P0-PUSCH-Set list are associated with the second SRS resource set; and the at least one processor is configured to cause the UE to at least one of:

if the DCI includes a first SRS resource indicator (SRI) field associated with the first SRS resource set and a value of the first open-loop power control parameter set indication is '1', determine the first P0 value from a first value in the first P0-PUSCH-Set list with a P0-PUSCH-Set-ID value mapped to a value of the first SRI field;

if the DCI does not include a SRI field associated with the first SRS resource set and the value of the first open-loop power control parameter set indication is '1' or '01', determine the first P0 value from a first value in the first P0-PUSCH-Set list with a lowest P0-PUSCH-Set-ID value; or if the DCI does not include a SRI field associated with the first SRS resource set and the value of the first open-loop power control parameter set indication is '10', determine the first P0 value from a second value in the first P0-PUSCH-Set list with the lowest P0-PUSCH-Set-ID value.

19. The UE of claim 13, wherein:

the DCI includes two open-loop power control parameter set indications and the configuration information indicates two lists of P0-PUSCH-Set;

a first open-loop power control parameter set indication and a first P0-PUSCH-Set list are associated with the first SRS resource set, and a second open-loop power control parameter set indication and a second P0-PUSCH-Set list are associated with the second SRS resource set; and the at least one processor is configured to cause the UE to at least one of:

if the DCI includes a second SRS resource indicator (SRI) field associated with the second SRS resource set and a value of the second open-loop power control parameter set indication is '1', determine the second P0 value from a first value in the second P0-PUSCH-Set list with a P0-PUSCH-Set-ID value mapped to a value of the second SRI field;

if the DCI does not include a SRI field associated with the second SRS resource set and the value of the second open-loop power control parameter set indication is '1' or '01', determine the second P0 value from a first value in the second P0-PUSCH-Set list with a lowest P0-PUSCH-Set-ID value; or if the DCI does not include a SRI field associated with the second SRS resource set and the value of the second open-loop power control parameter set indication is '10', determine the second P0 value from a second value in the second P0-PUSCH-Set list with the lowest P0-PUSCH-Set-ID value.

20. A method performed by a base station, the method comprising:

transmitting downlink control information (DCI) scheduling a plurality of repetitions of a physical uplink shared channel (PUSCH) transmission, the DCI including at least one open-loop power control parameter set indication;

transmitting configuration information associated with the PUSCH transmission, the configuration information indicating a first sounding reference signal (SRS) resource set and a second SRS resource set, a mapping pattern, and at least one list of P0-PUSCH-Set, wherein a first part of the plurality of repetitions is associated with the first SRS resource set and a second part of the plurality of repetitions is associated with the second SRS resource set according to the mapping pattern;

receiving the first part of the plurality of repetitions according to a first P0 value determined based on the received DCI and configuration information; and receiving the second part of the plurality of repetitions according to a second P0 value determined based on the received DCI and configuration information.

* * * * *